July 7, 1970  M. HESS  3,519,692

PREPARATION OF META-RICH CRESOLS

Filed Feb. 6, 1967

INVENTOR.
MARTIN HESS

BY William G. Kratz, Jr.
his Agent excellent# United States Patent Office 3,519,692
Patented July 7, 1970

3,519,692
PREPARATION OF META-RICH CRESOLS
Martin Hess, Pittsburgh, Pa., assignor to Koppers
Company, Inc., a corporation of Delaware
Filed Feb. 6, 1967, Ser. No. 614,316
Int. Cl. C07c *39/02*
U.S. Cl. 260—621      4 Claims

ABSTRACT OF THE DISCLOSURE

Mono-butyl-para-cresol and cresol mixtures that have a high proportion of meta-cresol are produced by the trans-alkylation of a commercially available mixture of meta-, para-cresol isomers to which mixture there has been added mono-butyl-meta-cresol. The trans-alkylation yields mono-butyl-para-cresol at the expense of the para-cresol present in the initial commercial cresol mixture; consequently, the proportion of meta-cresol in the product cresol mixture rises. The process is also applicable to produce meta-, para-cresol mixtures having a high meta-cresol content and mono-butyl-para-cresol from para-cresol. Cresol mixtures high in meta-cresol content are especially useful in resin preparations and the mono-butyl-para-cresol produced is useful as a preservative and readily butylated to give the valuable antioxidant 2,6-di-t-butyl-4-methylphenol.

BACKGROUND OF THE INVENTION

Cresols obtained from coal tar are mixtures of ortho-, meta-, and para-cresol. The ortho-cresol can be separated by distillation but the close proximity of the boiling points of meta- and para-cresol prevent their separation by practical distillations. Commercially, the ortho-cresol is separated and sold as such and a mixture of meta-, para-cresols is sold. The mixture of meta-cresol and para-cresol is not readily useable in most chemical processes and the demand for the individual isomers varies. In the case of butylated cresols, the demand for di-butyl-para-cresol, a well-known antioxidant and stabilizer, derived from para-cresol is much greater than the demand for mono-butyl-meta-cresol derived from meta-cresol. Therefore, economics requires that para-cresol of relatively high purity be used for butylation processes in the preparation of di-butyl-para-cresol. On the other hand, cresol mixtures that are higher in meta-cresol content than is present in the commercial meta-, para-cresol mixture are preferable for certain commercial usage, as, for example, in the production of molding compound and adhesives.

A method heretofore used to separate meta-cresol and para-cresol as individual compounds from the commercial mixture has been to alkylate the cresol mixtures and then separate the alkylated products and subsequently dealkylate the separated alkylated cresols. Such process, however, often results in loss of material and in polymerization of the various phenolic constituents and evolved olefins.

SUMMARY OF THE INVENTION

The present invention provides a process by which a mixture that is rich in its meta-cresol content can be produced from a commercially available cresol mixture through the trans-alkylation of the cresol mixture with added mono-butyl-meta-cresol (2-t-butyl-5-methylphenol). The process, in effect, transforms the para-cresol in the initial mixture to mono-butyl-para-cresol (2-t-butyl-4-methylphenol); and, at the same time, transforms the added mono-butylmeta-cresol to meta-cresol; separation of the fractions yields mono-butyl-para-cresol and a meta-cresol rich mixture of cresols.

In accordance with the invention, a commercially available cresol mixture, usually containing about 66 percent meta-cresol and 34 percent para-cresol, is contacted with mono-butyl-meta-cresol in the presence of a catalytic amount of an acidic alkylation catalyst and at an elevated temperature for a sufficient time to convert the para-cresol to mono-butyl-para-cresol. This reaction mixture is then neutralized, and the meta-cresol rich cresol mixture removed from the mono-butyl-cresols, preferably by distillation.

BRIEF DESCRIPTION OF THE DRAWING

A form of apparatus for effecting the process of the invention is schematically illustrated in FIG. 1, wherein a single trans-alkylation reactor is employed. The figure shows the feeding of a meta- and para-cresol mixture, a quantity of mono-butyl-meta-cresol and acid catalyst to a trans-alkylation reactor. From this reactor, following a predetermined reaction time, the mixture is fed to a neutralizer and from there to a separator which separates the meta-cresol rich cresol mixture and the para-rich mono-butylated cresols.

DETAILED DESCRIPTION

Figure 1:
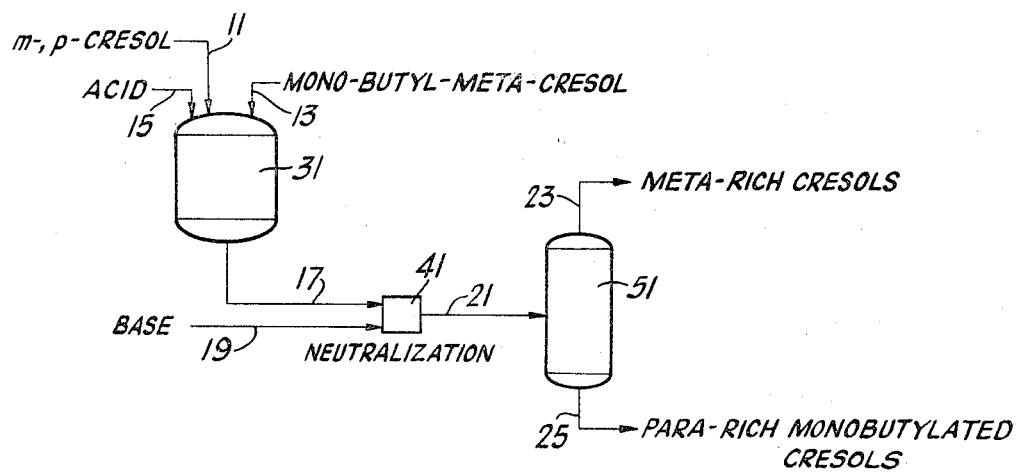

The process of the present invention may be more readily understood by reference to FIG. 1 which illustrates schematically one form of apparatus for effecting the process.

Referring specifically to FIG. 1, a mixture of meta- and para-cresol is fed through feed line 11, to the reactor 31. In addition, there is fed through feed line 13, a pre-determined amount of mono-butyl-meta-cresol and, through feed line 15, the acidic catalyst, such as sulfuric acid or the like. The reaction mixture is held in the reactor at an elevated temperature for a period of time sufficient to convert para-cresol in the original cresol mixture to mono-butyl-para-cresol by trans-alkylation with the mono-butyl-meta-cresol. The reaction mixture is then discharged from the reactor through line 17 and fed to a neutralizer 41, where the acid catalyst and acidic phenolic constituents in the reaction mixture are neutralized by a basic medium, such as sodium hydroxide, introduced through line 19. The neutralized mixture is then fed to a separator 51 through line 21 and the meta-cresol rich mixture of cresols separated and removed through line 23, for use as desired, while the para-rich mono-butylated-cresols are discharged through line 25 for use as desired.

The meta-cresol rich cresol mixture is used as such when taken from line 23 or it may be further enriched in meta-cresol by subsequent treatment.

The mono-butyl-cresols from line 25 comprise mono-butyl-meta-cresol and mono-butyl-para-cresol and may be used in my process for the preparation of di-butyl-para-cresol as described in an application entitled "Butylated Cresol Preparation" filed even date herewith. The mixture can also be used to produce the valuable di-butyl-para-cresol from the mono-butyl-para-cresol present therein while the mono-butyl-meta-cresol can be recycled for use in the present process.

Figure 2:
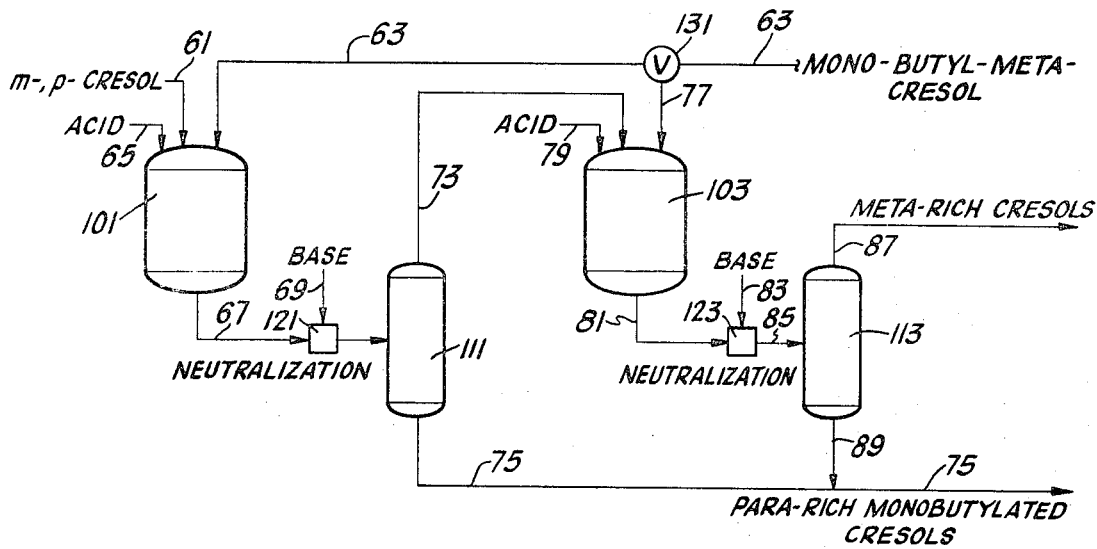
In FIG. 2, there is illustrated an alternative apparatus for use with the process in which the reactants are subjected to two trans-alkylation reactions and the resulting products are a higher meta-cresol containing cresol mixture and a higher para-isomer containing monobutylated cresol mixtures.

Referring to FIG. 2, there is illustrated a form of apparatus which utilizes more than one trans-alkylation reactor and results in an increased proportion of meta-cresol in the cresol mixture product.

A meta- and para-cresol mixture is fed to trans-alkylation reactor 101 through feed line 61. Also added to the reactor are the mono-butyl-meta-cresol through feed line 63 and the catalyst, such as sulfuric acid or the like, through feed line 65. Following contact at an elevated temperature for the desired time, the reaction mixture is discharged through line 67 to neutralizer 121, where the acid constituents are neutralized by sodium hydroxide or other basic material fed through line 69. The neutralized mixture is fed to separator 111 where the cresol mixture, rich in meta-cresol, is separated from the mono-butyl-cresols. The mono-butyl-cresols are removed by line 75 for use as desired.

The meta-cresol rich cresol mixture is then fed through line 73 to a second trans-alkylation reactor 103; catalyst is fed through line 79; and by means of valve 131, mono-butyl-meta-cresol is fed from line 63 to feed line 77 and into the reactor 103. Following the required trans-alkylation time at a predetermined elevated temperature, the reaction mixture is discharged through line 81 to neutralizer 123. A base, such as sodium hydroxide, is fed through line 83 to the neutralizer 123 and the acidic constituents and catalyst are neutralized. The neutralized mixture is then fed by means of line 85 to a separator 113 and the mono-butylated cresols separated from the cresols. The mono-butylated-cresols are discharged by line 89 and can be combined with the mono-butylated-cresols in line 75 for any desired use. The cresol mixture removed from the separator through line 87 contains an exceptionally high proportion of meta-cresol and is especially useful for molding compounds or adhesives.

In the process, the trans-alkylation is carried out using a catalytic amount of an acidic alkylation catalyst. The amount of catalyst used is generally about 0.025 to 10% by weight of the cresolic mixture being subjected to the trans-alkylation process. If less than about 0.025 of the catalyst is used, the alkylation is slow. For economic reasons, there is no advantage to using greater than 10 weight percent of catalyst although no adverse effects to the process would be obtained thereby.

It is preferred to use temperatures during the trans-alkylation process in the order of about 50–175° C. If temperatures below about 50° C. are used, the reaction is sluggish and time-consuming. The temperatures in excess of 175 C. are disadvantageous because of the increased side reactions and tendency of polymerization to occur in the reaction mass.

In the process, it is preferable to use sulfuric acid as the trans-alkylation catalyst, however, other acidic catalysts such as other mineral acids, such as phosphoric acid, perchloric acid, Friedel-Crafts catalysts, aryl and alkyl sulfonic acids, such as benzenesulfonic acid, phenolsulfonic acid, phenoldisulfonic acid and the like, in addition to other alkylation catalysts known in the art may be used.

The reaction is carried out at pressures ranging from sub or atmospheric pressure up to about 3,000 p.s.i.g. From the standpoint of equipment costs, the use of near atmospheric pressures is most desirable. However, positive pressures up to about 3,000 p.s.i.g. may be used although it is obviously advantageous for economic reasons to run the reaction at the lowest convenient pressure.

The reaction time may be conveniently determined by sampling the reaction mixture and determining the constitution of the samples by vapor phase chromatography or other analytic methods in order that the reaction time for specific process runs can be determined.

The reaction is conveniently carried out in the absence of a solvent although, if desired, any solvent which is inert to the reactants and the catalysts under the conditions of the reaction can be employed. Suitable such solvents include benzene, toluene, xylene, Tetralin, Decalin, hexane, heptane, cyclohexane, and the like.

The exact mechanism which occurs in the trans-alkylation is not fully understood. The mono-butyl-meta-cresol is trans-alkylated with para-cresol to form mono-butyl-para-cresol and meta-cresol. It is probable that the tertiary-butyl group of the mono-butyl-meta-cresol is removed by the acidic catalyst and the system is activated to an extent which causes this group to attack preferentially the para-cresol and thus form mono-butyl-para-cresol. The reactivities of the various reactants are such that the mono-butyl-para-cresol is formed at the expense of the mono-butyl-meta-cresol and that the desirable enriched meta-cresol mixture of cresols and the mono-butyl-para-cresol are formed.

The operation can be carried out batch-wise or continuously as desired. Unreacted starting materials and catalysts are readily recycled for use in a subsequent run.

My process is further illustrated by the following examples.

EXAMPLE I

A commercial mixture of meta- and para-cresol, containing ten moles of meta-cresol and 5 moles of para-cresol was fed to a trans-alkylation reactor, along with twenty moles of mono-butyl-meta-cresol, to form a trans-alkylation mixture. Also fed to the reactor was concentrated sulfuric acid in an amount corresponding to 0.5% by weight of the total cresolic mixture as a catalyst. The reaction mixture was held at 90° C. for about 4 hours; then the reaction was stopped by cooling the reaction mass. The reaction product was neutralized, and analyzed by gas chromatography. Analysis of the product showed:

| Compound: | Moles |
| --- | --- |
| Para-cresol | 1.58 |
| Meta-cresol | 13.42 |
| Mono-butyl-meta-cresol | 16.58 |
| Mono-butyl-para-cresol | 3.42 |

The cresols were separated from the alkylated cresol by distillation. The cresol fraction was found to contain 89.5% meta-cresol and 10.5% para-cresol.

The mono-butylated cresol fraction contained only 16.58 moles of mono-butyl-meta-cresol whereas 20 moles had been present in the original mixture. On the other hand, 3.4 moles of mono-butyl-para-cresol was produced. The mono-butyl-para-cresol is readily butylated in commercial processes to the valuable di-butyl-para-cresol.

EXAMPLE II

A cresol mixture comprised of 0.5 mole of meta-cresol and 0.5 mole of para-cresol was charged to a trans-alkylation reactor along with 1.0 mole of mono-butyl-meta-cresol and 0.5% by weight of sulfuric acid. A trans-alkylation was carried out as in Example I. Following the trans-alkylation reaction and neutralization, the product analyzed:

| Compound: | Moles |
| --- | --- |
| Meta-cresol | 0.802 |
| Para-cresol | 0.198 |
| Mono-butyl-meta-cresol | 0.698 |
| Mono-butyl-para-cresol | 0.302 |

The product was separated by distillation into a cresol fraction and an alkylated cresol fraction. The cresol mixture was comprised of meta- and para-cresol, the meta-cresol isomer constituting 80% of the total mixture. Also produced in the alkylated cresol fraction was 0.302 mole of mono-butyl-para-cresol.

EXAMPLE III

To a trans-alkylation reactor was charged 0.5 mole of para-cresol, one mole of mono-butyl-meta-cresol, and 0.5% by weight of sulfuric acid. The charge was subjected to trans-alkylation under the conditions of Example I. The resulting product after neutralization, analyzed:

| Compound: | Moles |
| --- | --- |
| Meta-cresol | 0.373 |
| Para-cresol | 0.127 |
| Mono-butyl-meta-cresol | 0.627 |
| Mono-butyl-para-cresol | 0.373 |

The cresol and alkylated cresol fractions were separated by distillation. The cresol fraction was a cresol mixture of meta- and para-cresol, in which mixture 75% was meta-cresol. The alkylated cresol fraction contained 0.373 mole of mono-butyl-para-cresol.

EXAMPLE IV

The cresol fraction obtained from Example I was subjected to a second trans-alkylation reaction. This cresol fraction containing 1.58 moles of para-cresol and 13.42 moles of meta-cresol was charged to a trans-alkylation reactor along with an additional 20 moles of mono-butyl-meta-cresol and with 0.5% by weight of the cresolic mixture of sulfuric acid as catalyst. After maintaining the mixture at 85° C. for 5 hours, the reaction was stopped, and the reaction product neutralized. Analysis of the product by gas chromatography showed there to be present:

| Compound: | Moles |
| --- | --- |
| Para-cresol | 0.48 |
| Meta-cresol | 14.52 |
| Mono-butyl-meta-cresol | 18.90 |
| Mono-butyl-para-cresol | 1.10 |

On separation of the cresols from the mono-butylated cresols by distillation, there was obtained a cresol mixture containing 97% meta-cresol with the remainder para-cresol. The alkylated cresol fraction showed that there had been produced 1.1 moles of mono-butyl-para-cresol.

I claim:
1. In a process for increasing the meta-isomer content of an initial cresol mixture, consisting essentially of meta- and para-cresol isomers, the improvement comprising:
   (a) contacting said initial cresol mixture and mono-butyl-meta-cresol in the presence of at least 0.025 percent by weight, based on the weight of the mixture of meta-para-cresol and mono-butyl-meta-cresol, of an acidic alkylation catalyst at a temperature of about 50–175° C., for a time sufficient to convert the para-cresol isomer in said initial mixture to monol butyl-para-cresol and to convert said mono-butyl-meta-cresol to the meta-cresol isomer;
   (b) neutralizing the reaction mixture; and
   (c) distilling the meta- and para-cresols from the mono-buytl-cresols to obtain a mixture of meta- and para-cresols having an increased content of meta-cresol and a decreased content of para-cresol, than had said initial cresol mixture, such that the increase of meta-cresol is equal to the decrease in para-cresol.
2. The process of claim 1 wherein said cresols having a higher content of meta-cresol are contacted with additional mono-butyl-meta-cresol to further increase the meta-isomer content therein.
3. A process for increasing the meta-isomer content of an initial cresol mixture consisting essentially of meta- and para-cresol isomers and having less than 80 moles of the meta-isomer per mole of the para-isomer comprising:
   (a) contacting said initial cresol mixture with at least one mole of mono-butyl-meta-cresol per mole of said initial cresol mixture in the presence of 0.1–5 percent by weight of said combined initial cresol mixture and mono-butyl-meta-cresol, of an acidic alkylation catalyst, at a temperature of 50–125° C., and a pressure of atmospheric to 3,000 p.s.i.g. for a time sufficient to convert the para-isomer of said initial mixture to mono-butyl-para-cresol and to convert said mono-butyl-meta-cresol to said isomer;
   (b) neutralizing the reaction mixture; and
   (c) distilling the meta- and para-cresols from the mono-butyl-cresols to obtain a mixture of meta- and para-cresols having an increased content of meta-cresol and a decreased content of para-cresol than the said initial cresol mixture, such that the increase of meta-cresol is equal to the decrease of para-cresol.
4. The process of claim 3 wherein said cresols having a higher content of meta-cresol are contacted with additional mono-butyl-meta-cresol to further increase the meta-isomer content therein.

References Cited

UNITED STATES PATENTS

| Re. 26,150 | 10/1952 | Nickels. | |
| 3,014,079 | 12/1961 | Olin. | |
| 2,206,924 | 7/1940 | Stevens et al | 260—624 |
| 2,802,884 | 8/1957 | D'Alelio | 260—624 |

FOREIGN PATENTS

| 748,269 | 4/1956 | Great Britain. |
| 555,751 | 9/1943 | Great Britain. |

BERNARD HELFIN, Primary Examiner

W. B. LONE, Assistant Examiner

U.S. Cl. X.R.

260—624